May 2, 1939.　　　M. G. JACOBSON　　　2,156,693
GAS TESTING
Filed Nov. 12, 1936　　　2 Sheets-Sheet 2
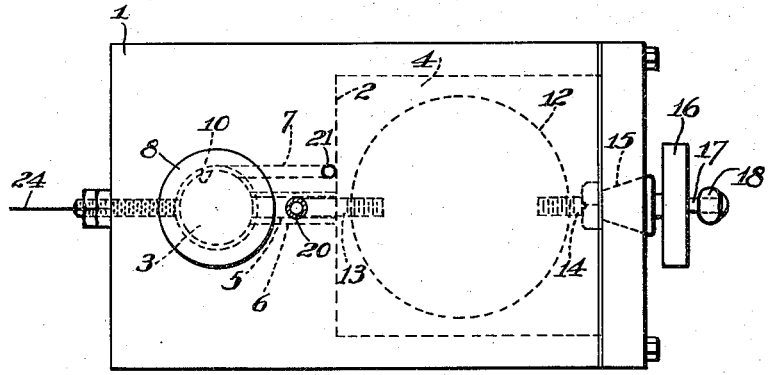
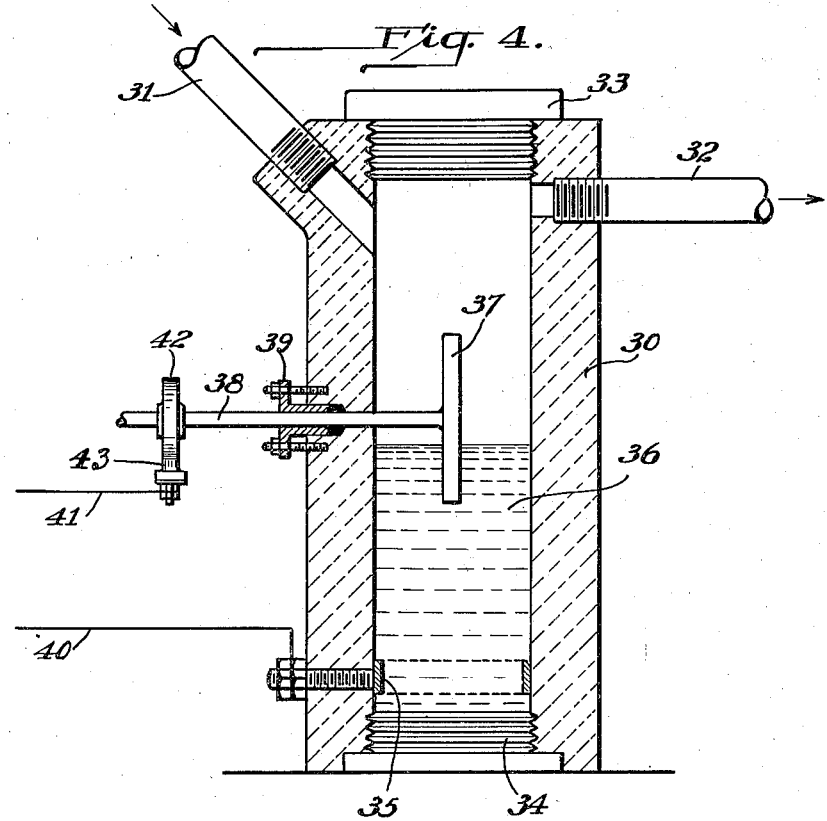
WITNESSES
INVENTOR.
Moses G. Jacobson
BY Brown, Critchlow & Flick
his ATTORNEYS.

Patented May 2, 1939

2,156,693

UNITED STATES PATENT OFFICE 2,156,693

GAS TESTING

Moses G. Jacobson, Swissvale, Pa., assignor to Mine Safety Appliances Company, Pittsburgh, Pa., a corporation of Pennsylvania Application November 12, 1936, Serial No. 110,506

21 Claims. (Cl. 23—232)

This invention relates to gas testing, more particularly to a method and apparatus for the detection and quantitative determination of particular constituents present in gases or gas mixtures.

It is among the objects of the invention to provide a method of gas testing whereby the presence or concentration, either or both, of a particular constituent of the gas being tested may be rapidly and readily determined, which is simple, is satisfactorily accurate, and does not require complicated and expensive apparatus, and in which the constituent to be determined is applied to the generation of an electromotive force which is a definite function of the concentration of that constituent.

A further object is to provide apparatus for use in the practice of the method provided by the invention which is of simple and inexpensive construction, which is readily used, portable, and rugged, and whose operation does not require scientific training or experience.

Figure 1:
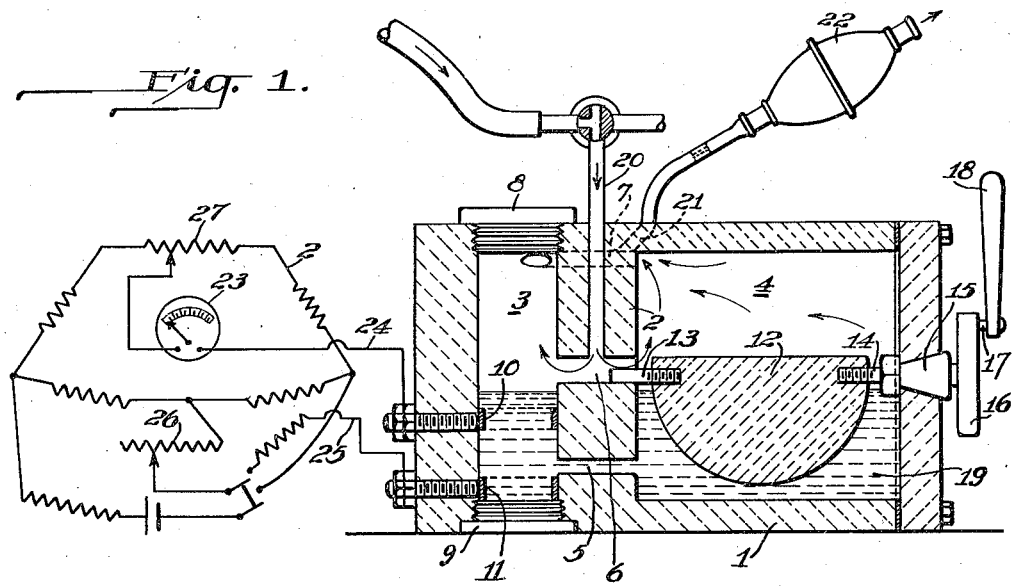
Figure 2:
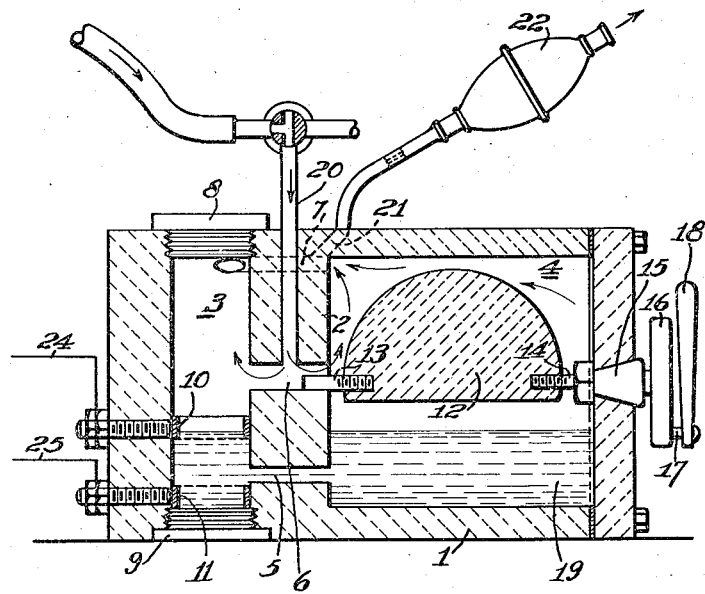

The invention may be described in connection with the accompanying drawings in which Fig. 1 is a vertical sectional view through one embodiment of the apparatus provided by the invention, and showing, schematically, an electrical circuit particularly adapted to the practice of the invention; Fig. 2 a view similar to Fig. 1 showing the parts in another position used in the operation of the device; Fig. 3 a plan view of the device shown in Figs. 1 and 2; and Fig. 4 a vertical section through another embodiment of the invention.

The invention is predicated in part upon my conception that the presence and concentration, either or both, of a constituent of a gaseous atmosphere may be determined readily by contacting the gas with an electrode formed of material which is reactive with that constituent and which is partly immersed in an electrolyte capable of destroying or removing from the electrode the product of reaction between the electrode and the gaseous constituent. The resultant electromotive force created between that electrode and another similar electrode which is wholly immersed in the electrolyte is applied to indicate the presence or concentration of the constituent.

More particularly, in accordance with the invention there is provided a voltaic cell comprising a pair of electrodes formed of material reactive with the constituent which is to be determined, and an electrolyte which is adapted to displace from the electrode material the product of such reaction. In the cell one of the electrodes is maintained continuously wholly submerged in the electrolyte, and the other electrode is so arranged that a portion of it may be exposed to the gaseous constituent and the remainder submerged in the electrolyte. When the gaseous atmosphere containing the constituent which is reactive with the electrode is passed into contact therewith, there will be generated an electromotive force within the cell.

Where it is desired only to determine the presence of the constituent being tested for, the E. M. F. of the cell is used to operate any suitable electrical indicating means such as a galvanometer or milliammeter, the needle movement showing the presence of the constituent in the gas being tested. Or, it may be amplified or actuate a relay means to operate an audible or visual signal.

This E. M. F., as I have confirmed by tests, is a function of the concentration of the constituent in the gas mixture under test. Therefore it may be applied directly to measurement of the concentration. For such purposes the best results are attained by measuring the E. M. F. of the cell after the production of an equilibrium between the reaction between the electrode and gas on the one hand, and the displacement of the reaction product from the electrode on the other hand. This may be accomplished in various ways, as by the use of a stationary partly immersed electrode, capillary forces drawing the electrolyte up into the region of the electrode which is acted upon by the gas, or by using a rotary electrode partly immersed in the electrolyte, or in other ways which will occur to those skilled in the art.

The electrodes used are composed of a metal, a metallic alloy, or other solid conductor of electricity which, either directly or after being wetted with the electrolyte, is reacted upon by the gas whose presence or concentration is to be determined. The electrolyte, on the other hand, is so chosen that it displaces from the electrode the product of the action of the gas thereon. This displacement may be effected in various ways, as through chemical decomposition of the reaction product by the electrolyte, by dissolution of the product in or its desorption by the electrolyte, or by other chemical or physical phenomena, and for brevity all such modes of displacement are comprehended by reference in some of the claims to solvent power of the electrolyte for the reaction products of the gas and electrode. As an example, where the invention is to be applied to the detection and estimation of oxygen in a gaseous mixture, the electrodes may be constructed of pure copper, and the electrolyte may be a solution of various salts or other compounds, the exact compound or combination of compounds used, and their concentration, being governed by the particular use to which the instrument is to be put. Thus, in the instance referred to the electrolyte may consist of a solution of ammonium hydroxide, or of ammonium chloride. Using ammonium hydroxide the absolute sensitivity is not as great as when the chloride is used, but the response is greatly accelerated, and the shape of the calibration curve is such that relatively large deflections of the electric meter are produced in the low range of oxygen concentration. With an ammonium chloride solution the results are the reverse of those obtained with ammonium hydroxide. Thus it appears that low concentrations of oxygen may be determined suitably using an electrolyte consisting of ammonium hydroxide in combination with a sensitive meter, while for analyzing compositions in which the oxygen content approaches that of pure air there may be used a solution of ammonium chloride. And for use over the entire range, the electrolyte may include both compounds.

In general it is desirable to add to the electrolyte a small amount of ammonium carbonate to decrease the absorption of carbon dioxide, thus decreasing the effect of carbon dioxide on the absolute sensitivity. I now prefer to use a solution of ammonium chloride ($NH_4Cl$), ammonium hydroxide ($NH_4OH$), and ammonium carbonate ($[NH_4]_2CO_3$) to which there has been added a small quantity of ammonio-cupric ions. The latter are supplied most easily by adding to the foregoing fresh solution a little solution which has been used for a protracted period of time and which contains the ammonio-cupric ion in large quantity, giving it a deep blue color. Such an electrolyte has little, if any, influence on the pure copper electrode, but it displaces the oxidation product from the electrode.

In general, rather high dilution of the electrolyte is desirable because thereby the instrument keeps its sensitivity setting on air longer than where concentrated solutions are used, and electrode and electrolyte life is prolonged. The limit of dilution is fixed by the sensitivity of the meter used, as will be recognized.

Having reference now to the drawings, Fig. 1 shows an apparatus embodying the principles which underlie the invention. It comprises a cell 1 in the form of a gas-tight case of electrically insulating material such as synthetic resin, hard rubber, glass, or other substances having suitable dielectric properties. The cell is divided interiorly by a heavy partition wall 2 forming compartments 3 and 4 which are intercommunicating through passages 5, 6 and 7. Compartment 3, suitably of cylindrical section, is provided with screw-threaded upper and lower closure members 8 and 9, respectively. Disposed in compartment 3 are two ring-shaped electrodes 10 and 11 spaced vertically from each other. Mounted in compartment 4 is a plunger member 12 rotatably supported on shafts 13 and 14. Shaft 14 extends through a gas-tight packing gland 15 and on its outer end is mounted a crank member 16 having a crank pin 17 connected to a handle 18 for moving the plunger to the raised and lowered positions shown in Figs. 1 and 2.

In the use of this apparatus an electrolyte 19 is placed in the cell in an amount such that when plunger 12 is in its raised position (Fig. 2) electrode 10 will be partly submerged in the electrolyte, as seen in Fig. 2. When the plunger is lowered to the position shown in Fig. 1, however, it will displace the electrolyte so that both electrodes are completely submerged.

When both electrodes are submerged in the electrolyte no electromotive force will be generated between the electrodes and the electrolyte since the electrolyte will remove from the upper electrode any reaction product that has been formed between it and the gas to which the electrodes are sensitive. When the electrodes are submerged, therefore, they are identical and there will be no E. M. F. created.

In making a test plunger 12 is raised from the solution to the position shown in Fig. 2, and the gas to be tested is passed into the interior of the cell through a conduit 20 which opens at its lower end into the cell, e. g., into passage 6. The gas circulates through the cell, contacts the exposed portion of electrode 10, and is withdrawn from the cell through passage 7 into a conduit 21. In the embodiment shown an aspirator bulb 22 is used to draw the gas through the cell.

If the gas contains the constituent with which the electrode is capable of reacting, the action between them will begin and the cell will now consist of unchanged electrode 11, the electrolyte 19, and electrode 10 which consists partly of the original material and partly of the product of reaction of the electrode and the gas, and accordingly an electromotive force will be generated. Due to capillary forces the electrolyte will be drawn up over the exposed portion of electrode 10 and will begin to exert its action upon the reaction product formed on the electrode. In a brief period of time an equilibrium will be reached between the two processes of formation of reaction product and its displacement from the electrode, and while the equilibrium condition prevails there will obviously be as much gas being displaced from the electrode as is being fixed by it. When this condition prevails the electromotive force will be constant.

The magnitude of the electromotive force under equilibrium conditions, other things being constant, depends upon the concentration of the particular constituent which is being determined in the gaseous atmosphere. The absolute sensitivity may change very slowly as the amount of gas taken up by the electrolyte increases. However, extensive tests of the invention have shown that even though the absolute values change as the reaction product is taken up by the electrolyte, the relative sensitivity, i. e., the ratio of the electromotive forces corresponding to two given concentrations of gaseous constituent is highly constant.

The electromotive force generated by the cell may be determined in various ways. As stated, it may be used to merely indicate the presence of the constituent, or it may be used for a quantitative determination as through the use of a Wheatstone bridge or potentiometer circuit. In the circuit shown in Fig. 1, the milliammeter 23 is connected by a wire 24 to electrode 10, and electrode 11 is connected by a wire 25 to the appropriate point of the circuit. The scale of the milliammeter is conveniently calibrated in terms of the concentration of the constituent being determined.

In view of the constancy of the ratio of milliammeter deflections corresponding to two given concentrations of gaseous constituent, the circuit includes a rheostat 26 connected in series with the millivoltmeter. Before making a test the instrument is calibrated, and where oxygen is being determined atmospheric air is used for that purpose. To this end air is aspirated through the cell by bulb 22 and plunger 12 is turned into its up position (Fig. 2). When the pointer of the milliammeter has come to rest it is adjusted by means of rheostat 26 to show 21 per cent of oxygen on the scale. The plunger is then turned into its down position (Fig. 1) until the pointer has come back to zero, due to complete removal of oxidation product from electrode 10, thus putting both electrodes in identical condition. The gas to be tested is then aspirated, the plunger turned up, and when the pointer has come to its rest position the concentration of gas is read directly on the scale of the meter. A complete test, including the calibration on air, can be completed in not more than about five minutes. Of course, with other gases than oxygen, known concentrations in a gas mixture are used to calibrate the instrument.

In order to avoid waiting for the pointer to return exactly to zero in case of small differences in the electrodes, the circuit has been specially arranged for zero adjustment. With this circuit when the pointer with the plunger in the down position does not come back to zero within a brief interval, say two minutes, it is adjusted to zero by means of a rheostat 27. The circuit shown will operate on a small No. 2 dry cell which will last for at least six months.

When the determinations are completed, say at the end of the day, the cell should be thoroughly cleansed. To this end closure members 7 and 8 are so arranged as not to restrict the openings in chamber 3, thus permitting easy flushing out, cleaning and drying of the chamber and the electrodes.

Another embodiment of the invention is shown in Fig. 4. This comprises a cell 30 of electrically insulating material provided with an inlet 31 and an outlet 32 for the gas to be tested. The cell is provided also with upper and lower closure members 33 and 34, respectively. Disposed toward the lower end of the cell is a ring electrode 35 mounted to be continuously wholly submerged in the electrolyte 36. Mounted thereabove is a disc electrode 37 of the same material mounted vertically on a shaft 38 which may be rotated by any suitable means, not shown. Shaft 38 passes through a gas-tight packing gland 39. The electromotive force generated in the cell is passed by wires 40 and 41 to any suitable measuring means or circuit, the current being taken from shaft 38 in any suitable manner as by a slip ring and a contact brush indicated schematically at 42 and 43.

In the use of this apparatus electrode 37 is rotated continuously, thus progressively and continuously moving the exposed portion with its reaction product downwardly into the electrolyte which removes the reaction product, those portions of the electrode which have been thus cleaned moving progressively and continuously upwardly into the gas space for further reaction with the gas. In this manner the equilibrium condition is achieved without dependence upon capillary forces and without the use of special means for raising and lowering the level of the electrolyte.

The electrodes may take a variety of forms, as will be realized. For instance, they may be formed of wire gauze or of imperforate material, and they may consist of pure metal or metallic alloy, or of other solid conductor or semi-conductor such as carbon or a salt, or they may be formed by compressing a powdered salt or impregnated charcoal. They may be in the shape of rings, which are especially suitable in apparatus of the type shown in Figs. 1 to 3, or, as in the apparatus shown in Fig. 4, the electrodes may take the form of circular discs.

The apparatus shown in Fig. 4 has the further advantage, as contrasted with that shown in Figs. 1 to 3, that by varying the speed of rotation of electrode 37 and the ratio of the portion of the electrode submerged in the electrolyte to that exposed to the gas, there is much wider control over the equilibrium point between the reaction and displacement, and better control over sensitivity and scale characteristics.

Although reference has been made herein to determination of a particular constituent of a gaseous atmosphere or mixture, it will be understood that the invention is applicable not only to the determination of the presence or concentration of a given constituent of a true gaseous mixture, but also to the determination of the purity of a particular gas. The invention is likewise not restricted to the determination of oxygen which has been referred to herein purely by way of illustration, not by way of limitation. As will be understood, it is equally applicable to the determination of other gases, such as chlorine, hydrogen sulfide, and others, by appropriate selection of the electrode and electrolyte materials, which can be done by those skilled in the art. Thus, for the determination of hydrogen sulfide ($H_2S$), there may be used electrodes of magnesium (Mg) and an electrolyte formed of a very weak solution of sulfuric acid ($H_2SO_4$). The hydrogen sulfide forms magnesium sulfide at the exposed portion of the electrode, and this reaction product is dissolved in the electrolyte when the electrode is submerged therein. The small amount of sulfuric acid present prevents the electrolyte from absorbing any considerable amount of hydrogen sulfide. Again, in the determination of chlorine there may be used tin (Sn) electrodes and an electrolyte consisting of a weak aqueous solution of ammonium stannic chloride ($[NH_4]_2SnCl_6$) and ammonium chloride ($NH_4Cl$). The tin and chlorine react to form stannic chloride ($SnCl_4$) which upon submersion of the electrode is converted to ammonium stannic chloride and dissolved.

Various additions or alterations may be made in the method and apparatus described without departing from the inventon. Thus, the E. M. F. of the cell may be used to actuate recording or control mechanism. Similarly, a pump may be used to force the gas sample through the cell, and the rotatable plunger of the apparatus shown in Figs. 1 to 3 may be replaced by a vertically reciprocable plunger.

Also, while it is preferred now to form both electrodes of the same material, because electrical neutrality may thus be reached as described hereinabove, it will be understood that the submerged electrode may be made from a material which is not attacked, such, for example, as gold. In such event the E. M. F. of the cell will not be zero when the active electrode is submerged but the meter pointer can be adjusted to zero by means of the electrical balancing circuit, as will be understood from what has been said hereinabove.

According to the provisions of the patent statutes, I have explained the principle and mode of construction and operation of my invention, and have illustrated and described what I now consider to be its best embodiment. However, I desire to have it understood that, within the scope of the appended claims the invention may be practiced otherwise than as specifically illustrated and described.

I claim:

1. In a gas testing apparatus the combination of a container, a pair of electrodes disposed in spaced relation therein and adapted for connection to electromotive force measuring means one of said electrodes being formed of a material reactive with the gas to be determined, an electrolyte in said container adapted to displace from said reactive electrode reaction product of said gas and said material, and said reactive electrode being positioned to have a part exposed to gas sample and part immersed in said electrolyte, means for contacting said exposed electrode part with said electrolyte, and means for passing gas into said container into contact with said exposed electrode part.

2. In a gas testing apparatus the combination of a container, a pair of electrodes disposed in spaced relation therein and adapted for connection to electromotive force measuring means, said electrodes being formed of a material reactive with the gas to be determined, an electrolyte in said container adapted to displace reaction product of said gas and said material, one of said electrodes being continuously covered by said electrolyte, and the other electrode being positioned to have a part exposed to gas sample and part immersed in said electrolyte, means for periodically covering said exposed electrode part with said electrolyte, and means for passing gas into said container into contact with said exposed electrode part.

3. In a gas testing apparatus the combination of a gas-tight container provided with gas inlet and outlet openings, a pair of electrodes disposed in spaced vertical position therein and adapted for connection to electromotive force measuring means, said electrodes being formed of a material reactive with the gas to be determined, an electrolyte in said container adapted to displace reaction product of said gas and said material, the lower of said electrodes being continuously covered by said electrolyte, means disposed in said container for changing the level of said electrolyte to cause the upper electrode to be alternately completely covered and then to have a part exposed to gas sample and part immersed in said electrolyte, means disposed exteriorly of said container for actuating said level-changing means, a connection between said actuating and level-changing means extending in gas-tight relationship through a wall of said container, and means associated with said gas inlet opening for passing gas into said container into contact with said exposed electrode part.

4. In a gas testing apparatus the combination of a container, a stationary electrode disposed in said container, a rotary electrode disposed in the container above said stationary electrode, said electrodes being formed of material reactive with the gas to be determined, an electrolyte in said container adapted to displace reaction product of said gas and said material, said stationary electrode being continuously covered by said electrolyte, and said rotary electrode being positioned to have a part exposed to gas sample and part immersed in said electrolyte, and means for passing gas into said container into contact with said exposed electrode part.

5. In a gas testing apparatus the combination of a gas-tight container provided with gas inlet and outlet openings, a pair of electrodes disposed in spaced vertical relation therein, and adapted for connection to electromotive force measuring means, said electrodes being formed of material reactive with the gas to be determined, en electrolyte in said container adapted to displace reaction product of said gas and said material, the lower electrode being continuously covered by said electrolyte, plunger means disposed in the container for raising and lowering the electrolyte level to alternately completely cover the upper electrode and then to have a part of it exposed to gas sample and part immersed in said electrolyte, means disposed exteriorly of said container for actuating said plunger, a connection between said actuating means and plunger extending in gas-tight relationship through a wall of said container, and means associated with said gas inlet opening for passing gas into said container into contact with said exposed electrode part.

6. In a gas testing apparatus the combination of a gas-tight container provided with gas inlet and outlet openings and with a pair of intercommunicating compartments, a pair of electrodes disposed in spaced vertical relation in one of said compartments and adapted for connection to electromotive force measuring means, said electrodes being formed of material reactive with the gas to be tested, an electrolyte in said compartments adapted to displace reaction product of said gas and electrode material, and means disposed in the other of said compartments for causing the upper electrode alternately to be exposed in part to gas sample, and then to be wholly submerged in the electrolyte, while continuously maintaining the lower electrode continuously submerged, means disposed exteriorly of said container for actuating said electrode-submerging means, a connection between said actuating and electrode-submerging means extending in gas-tight relationship to a wall of said container, and means associated with said gas inlet for passing gas sample into said container for contact with the exposed electrode part.

7. In a gas testing apparatus the combination of a gas-tight container provided with gas inlet and outlet openings and with a pair of intercommunicating compartments one of which is substantially circular in section and of substantially less volume than the other, a pair of ring-shaped electrodes disposed in spaced vertical relation in said circular section compartment and adapted for connection to electromotive force measuring means, said electrodes being formed of material reactive with gas to be determined, an electrolyte in said container adapted to displace reaction product of said gas and electrode material, a plunger in the larger of said compartments for causing the upper electrode alternately to be exposed in part to gas sample, and then to be wholly submerged in the electrolyte, while continuously maintaining the lower electrode continuously submerged, means disposed exteriorly of said container for actuating said plunger, a connection between said actuating and plunger means extending in gas-tight relationship through a wall of said container, and means associated with said gas inlet opening for passing gas sample into said container for contact with the exposed electrode part.

8. In a gas testing apparatus the combination of a container, a pair of electrodes disposed in spaced relation therein, one of said electrodes being formed of a material reactive with the gas to be determined, an electrolyte in said container adapted to displace reaction product of said gas and said material, one of said electrodes being continuously covered by said electrolyte, and said reactive electrode being positioned to have a part exposed to gas sample and part immersed in said electrolyte, means for contacting said exposed electrode part with said electrolyte, means for passing gas into said container into contact with said exposed electrode part, and electrical indicating means comprising an electrical meter, connections between said electrodes and meter, and a variable rheostat in said circuit for adjusting the meter to indicate a definite value when a standard gas concentration is admitted to the container.

9. In a gas testing apparatus the combination of a container, a pair of electrodes disposed in spaced relation therein, one of said electrodes being formed of a material reactive with the gas to be determined, an electrolyte in said container adapted to displace reaction product of said gas and said material, one of said electrodes being continuously covered by said electrolyte, and said reactive electrode being positioned to have a part exposed to gas sample and part immersed in said electrolyte, means for contacting said exposed electrode part with said electrolyte, means for passing gas into said container into contact with said exposed electrode part, and electrical means comprising an electrical meter, a source of electromotive force, a variable rheostat, circuit connections between said source of electromotive force, electrodes, rheostat, and meter forming a circuit in which a part of the voltage from said source may be added to or subtracted from the voltage between said electrodes, and a second variable rheostat connected with said meter to adjust its indication to a definite value when a standard gas concentration is passed into the container.

10. In a gas testing apparatus the combination of a container, a pair of electrodes disposed in spaced relation therein, one of said electrodes being formed of a material reactive with the gas to be determined, an electrolyte in said container adapted to displace reaction product of said gas and said material, one of said electrodes being continuously covered by said electrolyte, and said reactive electrode being positioned to have a part exposed to gas sample and part immersed in said electrolyte, means for contacting said exposed electrode part with said electrolyte, means for passing gas into said container into contact with said exposed electrode part, and electrical means comprising an electrical meter, a source of electromotive force, a variable potentiometer rheostat, two constant resistances, and circuit connections forming a Wheatstone bridge of said potentiometer rheostat and said two constant resistances, said electrodes and meter being included in one cross arm, and said source of electromotive force in the other cross arm, and a variable rheostat connected with said meter to adjust its indication to a definite value when a standard gas concentration is passed into the container.

11. In a gas testing apparatus, a voltaic cell including a container, a pair of electrodes disposed in said container and adapted for connection to an electromotive force measuring means, one of said electrodes being reactive to the gas to be determined, an electrolyte in said container adapted to remove from said reactive electrode product of reaction thereof with said gas, said reactive electrode being positioned relative to said electrolyte to have a portion exposed to gas to be tested, means for periodically wetting said exposed portion with said electrolyte, and means associated with said container for passing gas into contact with said exposed electrode portion.

12. That method of testing gas which comprises providing a voltaic cell including an electrode formed of material reactive with gas to be determined, and an electrolyte adapted to displace from said electrode product of reaction of said gas therewith, said electrode being partly immersed in said electrolyte; passing gas into contact with the exposed portion of said electrode, and determining the electromotive force created by said cell in consequence of such contact.

13. That method of testing gas which comprises providing a voltaic cell including an electrode formed of material reactive with said gas to be determined, and an electrolyte which acts as a solvent for product of reaction of said gas with said electrode, said electrode being partly immersed in said electrolyte; passing gas into contact with the exposed portion of said electrode, bringing product of reaction of said gas and electrode into contact with said electrolyte, and determining the electromotive force created by said cell in consequence of such treatment.

14. That method of testing gas which comprises providing a voltaic cell including an electrode formed of material reactive with said gas to be determined, and an electrolyte which acts as solvent to product of reaction of said gas with said electrode, said electrode being partly immersed in said electrolyte; passing gas into contact with the exposed portion of said electrode, immersing the reacted portion of said electrode in said electrolyte, and determining the electromotive force created by said cell in consequence of such treatment.

15. That method of testing gas which comprises providing a voltaic cell including an electrode formed of material reactive with said gas to be determined, and an electrolyte which acts as solvent to product of reaction of said gas with said electrode, said electrode being partly immersed in said electrolyte; passing gas into contact with the exposed portion of said electrode, then wetting said portion of said electrode with said electrolyte, and determining the electromotive force created by said cell when equilibrium has been established between reaction of said electrode and said gas and displacement of reaction product from said electrode by the electrolyte.

16. That method of testing gas which comprises providing a voltaic cell comprising two electrodes formed of material reactive with said gas to be determined, and an electrolyte which acts as solvent to product of reaction of said gas with the electrode material, one electrode being partly immersed and the other electrode being wholly submerged in said electrolyte; passing gas into contact with the exposed portion of said one electrode, wetting said exposed portion with said electrolyte, and determining the electromotive force created by said cell when equilibrium has been established between reaction of gas and said electrode and displacement of reaction product from said electrode by said electrolyte.

17. That method of testing gas for a constituent thereof which comprises providing a voltaic cell comprising an electrolyte and a pair of electrodes one of which is continuously wholly submerged in said electrolyte and the other of which is partly immersed in said electrolyte and is formed of material reactive with said constituent, said electrolyte acting as solvent to product of reaction between said constituent and said other electrode; alternately exposing a portion of said other electrode to said gas and then wholly submerging it in the electrolyte, and measuring the electromotive force created by the cell during such treatment when equilibrium has been attained between said reaction and the solution of reaction products by said electrolyte.

18. That method of testing gas for a constituent thereof which comprises providing a voltaic cell comprising an electrolyte and a pair of electrodes one of which is continuously wholly submerged in said electrolyte and the other of which is partly immersed in the electrolyte and is formed of material reactive with said constituent, said electrolyte acting as solvent to product of reaction between said constituent and said other electrode; contacting the exposed portion of said other electrode to said gas, rotating said other electrode while maintaining contact of gas with said exposed portion, and measuring the electromotive force created by the cell during such treatment when equilibrium has been attained between said reaction and the solution of reaction products by said electrolyte.

19. That method of testing gas for oxygen which comprises providing a voltaic cell including, as an electrolyte, an aqueous solution of ammonium compounds capable of dissolving copper oxide, and including also a pair of copper electrodes one of which is partly immersed in said electrolyte; wetting the exposed portion of said one electrode with said electrolyte and then alternately passing the gas into contact with the exposed portion of said one electrode and then wetting said exposed portion by said electrolyte, and measuring the electromotive force developed by the cell when equilibrium between reaction of oxygen on said exposed portion and displacement of resultant oxidation products from said portion by said electrolyte has been attained.

20. That method of testing gas for a constituent thereof which comprises providing a voltaic cell comprising an electrolyte and a pair of electrodes formed of material reactive with said constituent, said electrolyte acting as solvent to product of reaction between said constituent and said electrodes; passing the gas into contact with a portion of one only of said electrodes subjecting said electrode portion contacted with said gas and reacted upon thereby to the action of said electrolyte and simultaneously exposing a clean portion of the same electrode to the gas, and measuring the electromotive force created by the cell when equilibrium has been attained between reaction of the gas and said electrode portion and the solution of reaction products therefrom by said electrolyte.

21. A method according to claim 19, said electrolyte comprising ammonium carbonate, ammonium chloride, and ammonium hydroxide, and a small quantity of ammonio-cupric ions.

MOSES G. JACOBSON.